E. THOMPSON.
ICE CREAM FREEZER.
APPLICATION FILED DEC. 5, 1912.
1,081,790.
Patented Dec. 16, 1913.
4 SHEETS—SHEET 2.
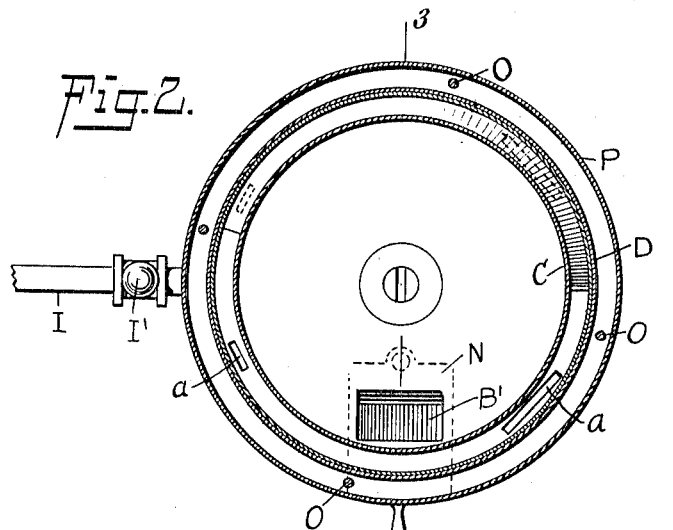
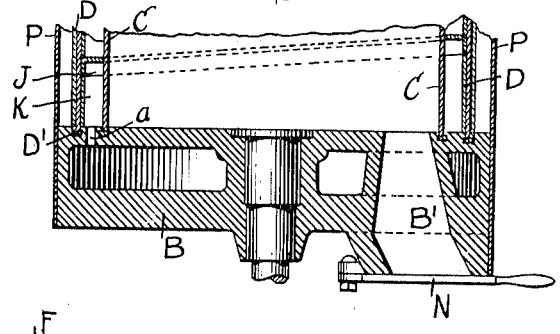
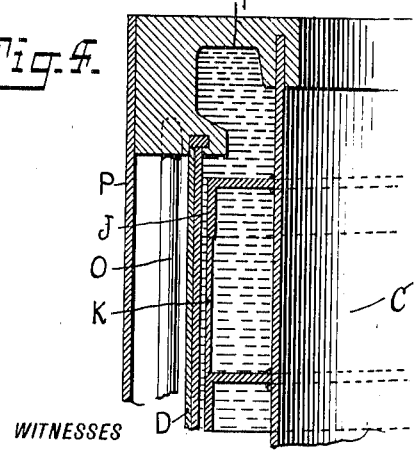
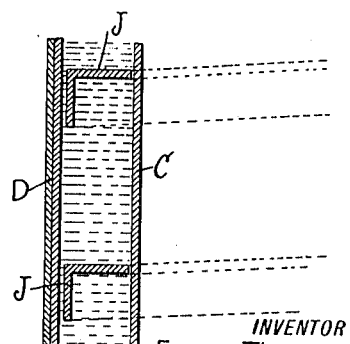
WITNESSES
William P. Goebel,
Rud. J. Hossted.
INVENTOR
Emery Thompson,
BY Munn & Co
ATTORNEYS

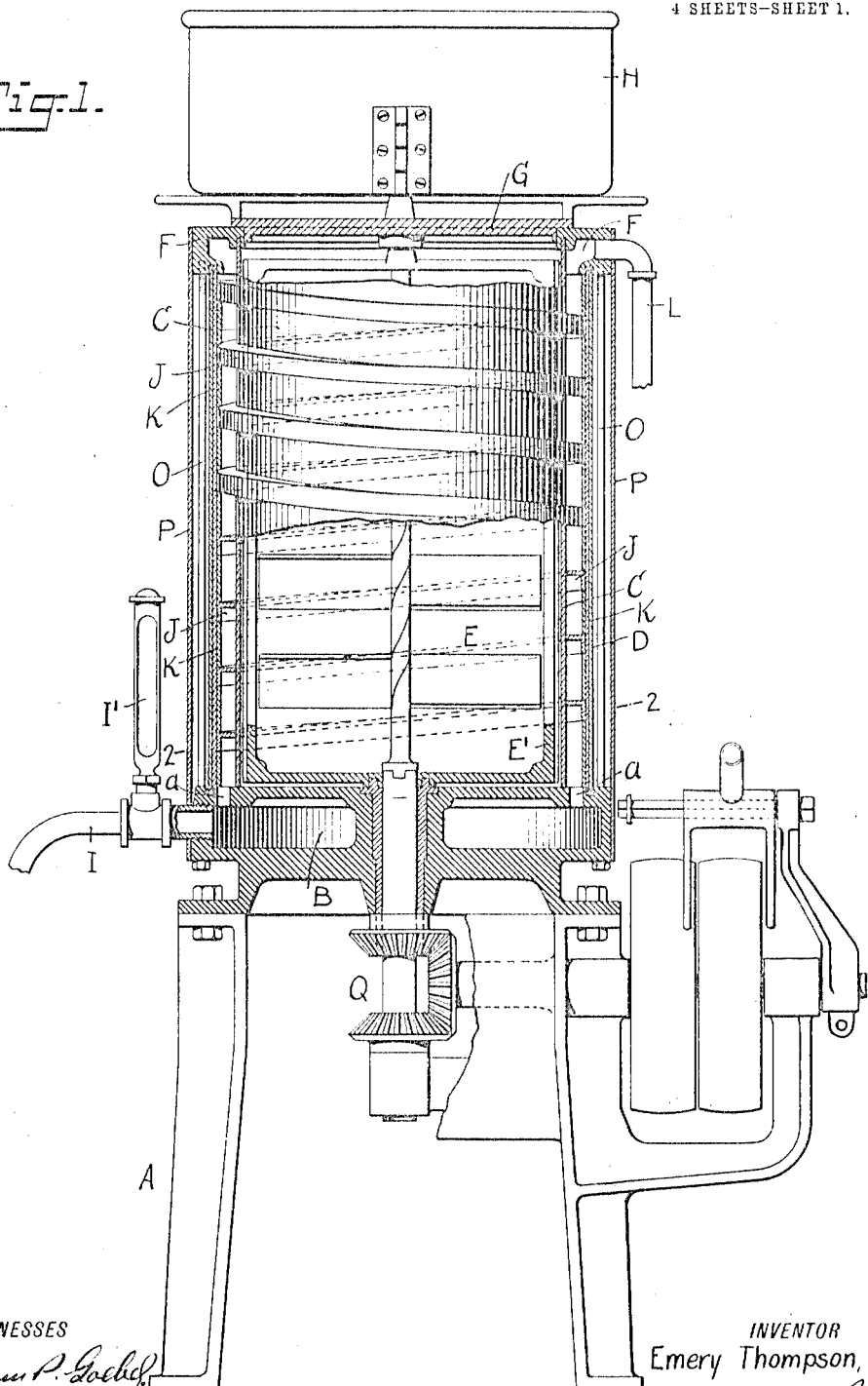

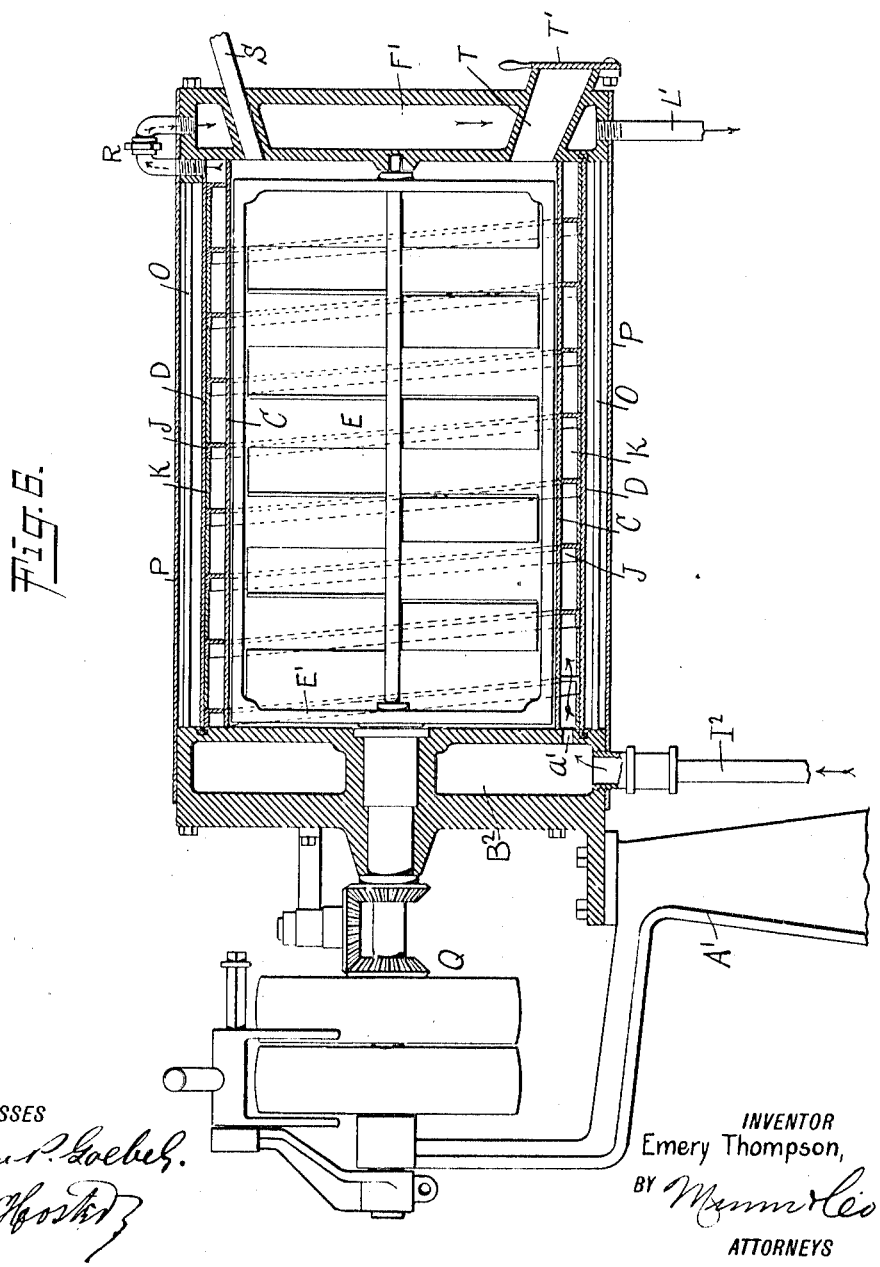

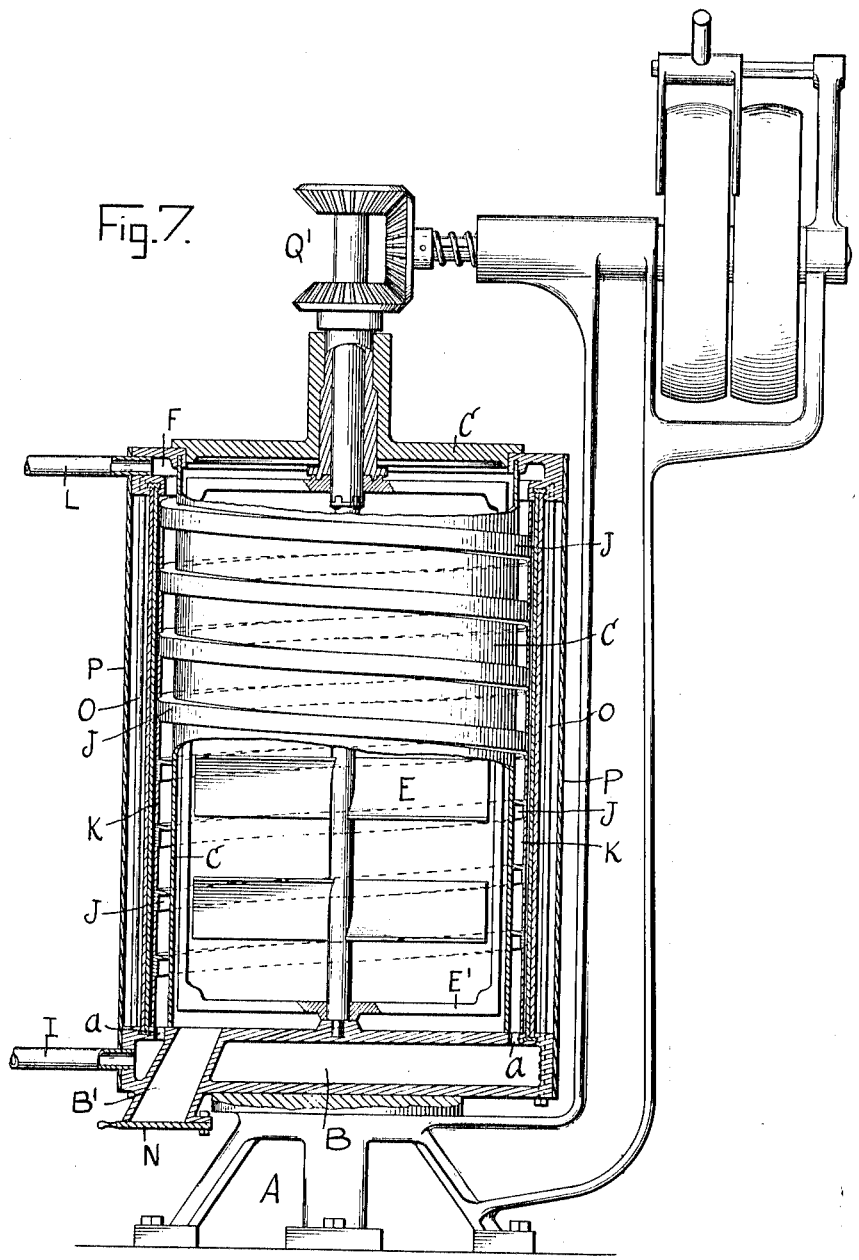

UNITED STATES PATENT OFFICE.

EMERY THOMPSON, OF NEW ROCHELLE, NEW YORK, ASSIGNOR TO EMERY THOMPSON MACHINE AND SUPPLY CO., OF NEW YORK, N. Y.

ICE-CREAM FREEZER.

1,081,790.　　　　Specification of Letters Patent.　　Patented Dec. 16, 1913.

Application filed December 5, 1912. Serial No. 735,087.

*To all whom it may concern:*

Be it known that I, EMERY THOMPSON, a citizen of the United States, and a resident of New Rochelle, in the county of Westchester and State of New York, have invented a new and Improved Ice-Cream Freezer, of which the following is a full, clear, and exact description.

The invention relates to ice cream freezers in which a circulating brine or similar freezing fluid is used as the freezing medium.

The object of the invention is to provide a new and improved ice cream freezer arranged to provide a large refrigerating surface, to avoid dormant non-freezing surfaces thus insuring a more rapid freezing and preventing deterioration in the texture and quality of the ice cream.

In order to accomplish the desired result use is made of a vessel for containing the material to be frozen, a chamber surrounding the said vessel, and a hollow head common to both the said vessel and the said chamber, the interior of the hollow head being in communication with the interior of the said chamber to allow the freezing medium to circulate through the hollow head and the said chamber.

A practical embodiment of the invention is represented in the accompanying drawings forming a part of this specification, in which similar characters of reference indicate corresponding parts in all the views.

Figure 1 is a sectional side elevation of an ice cream freezer of the vertical type and with the driving gear arranged at the bottom, parts of the ice cream freezer being shown in elevation; Fig. 2 is a sectional plan view of the same on the line 2—2 of Fig. 1, the driving gear being omitted; Fig. 3 is a cross section of the same on the line 3—3 of Fig. 2; Fig. 4 is a fragmentary vertical sectional view of a portion of the upper end of the casing; Fig. 5 is a like view of a modified form of the spiral passage between the outer and inner cylinders; Fig. 6 is a central vertical sectional view of an ice cream freezer of the horizontal type; and Fig. 7 is a vertical sectional view of an ice cream freezer of the vertical type and with the driving gear arranged at the top, parts of the ice cream freezer being shown in elevation.

The ice cream freezer shown in Fig. 1 is mounted on a suitably constructed stand A which supports a hollow bottom head B, on the top of which are set the inner and outer cylinders C and D arranged in spaced relation so as to form an inner vessel for containing the cream or other material to be frozen and to provide a chamber between the cylinders for the passage of brine or other suitable freezing medium.

Within the vessel is arranged an agitator E and a scraper E' of the usual type to agitate the ice cream or other material to be frozen. The upper ends of the cylinders C and D are engaged by a ring-shaped hollow upper closure F provided with a cover G on which is set the cream pan H from which the cream is discharged into the vessel by the use of a suitable valve, such as is common in ice cream freezers now in use.

The hollow bottom head B is connected by a pipe I with a source of freezing medium, and on the pipe is arranged the usual thermometer I' to indicate the temperature of the freezing medium. In the top of the bottom head B are arranged ports $a$ which open into the chamber or space between the cylinders C and D so that the freezing medium can pass from the hollow head B by way of the ports $a$ into the said chamber. Within this chamber is arranged a spiral J formed of angle iron and having its convolutions spaced apart, the horizontal member of the spiral having its inner end soldered or otherwise fastened to the exterior surface of the cylinder C while the outer vertical member is spaced from the inner surface of the outer cylinder D, as plainly indicated in Fig. 4. A spiral band K extends between the convolutions of the spiral J at the vertical members, and this band is likewise spaced from the inner surface of the outer cylinder D. By the arrangement described a spiral passage is provided between the cylinders C and D and through this spiral passage circulates the freezing medium, it being understood that by the construction described the freezing medium is in direct contact with the exterior surface of the inner cylinder C, and hence the freezing medium is very effective. The upper end of the spiral passage opens into the hollow closure F which is provided with an outlet pipe L for carrying off the freezing medium. Now it will be noticed that by the arrangement described the freezing medium circulates through the bottom head B, then passes through the spiral passage formed between the inner and outer cylinders C and D, to finally pass into the closure F and from the latter by way of the pipe L to a suitable place of discharge.

From the foregoing it will be seen that the cream or other material contained in the freezing vessel is subjected to the cold of the freezing medium contained in the hollow bottom head B as well as in the spiral passage, and hence a large refrigerating surface is provided and dormant non-freezing spaces are avoided.

The outer cylinder D is preferably made of steel and provided with a copper lining at the inside so as to provide an exceedingly strong structure.

It will be noticed that by spacing the vertical member of the spiral J and the band K from the inner surface of the outer cylinder D, the freezing medium can pass to the outside of the band and the spiral and consequently the pressure is equalized on both the inner and outer surfaces of the band to prevent buckling or injury thereof, the band being preferably soldered at its upper and lower edges to the corresponding convolutions of the spiral J.

The bottom head B is provided with a discharge opening B' (see Figs. 2 and 3) which connects at its upper end with the interior of the vessel, and, at its lower outer end, is normally closed by a manually-controlled gate or a valve N to allow of discharging the ice cream from the freezing vessel. The head B and closure F are preferably connected with each other by stays O arranged exteriorly of the outer cylinder D, and an inclosing shell P is preferably attached to the peripheral faces of the head B and closure F so as to give a fine finish to the ice cream freezer.

As shown in Fig. 1, the driving gear Q for the agitator E and the scraper E' is arranged at the bottom while in the construction shown in Fig. 7 the driving gear Q' for the agitator E and the scraper E' is arranged at the top, but otherwise the construction is practically the same as above described in reference to Fig. 1, so that further description of this modified form is not deemed necessary.

If desired, the spiral band K may be omitted and the spiral J of angle iron may be simply dropped into the space between the inner and outer cylinders C and D, as plainly indicated in Fig. 5, it being understood that the lower end of this spiral merely rests on the upper surface of the head B without being fastened to either of the cylinders C or D.

In the modified form shown in Fig. 6, the inner and outer cylinders C and D are disposed horizontally, and in the freezing chamber between the said cylinders are arranged the spiral J and the band K in the same manner as above described in reference to the construction disclosed in Fig. 1. The head $B^2$ in this case is attached to the stand A' and is made hollow and provided with the inlet $I^2$ for supplying the freezing medium. In the inner face of the head $B^2$ is arranged a port $a'$ which leads into the circulating chamber for the freezing medium. The head F' at the other end of the ice cream freezer is made hollow and is connected at its top by a pipe R with the outer end of the spiral passage so that the freezing medium can pass from the spiral passage by way of the pipe R into the hollow head F' from which leads the discharge pipe L' to carry off the freezing medium to a desired place of discharge. The head F' is provided with an inlet S for the cream and a discharge T for the ice cream, the outer end of the discharge being closed by a suitable manually-controlled valve T'.

From the foregoing it will be seen that the cream or other material contained in the freezing chamber is subjected to the action of the freezing medium circulating through the heads $B^2$ and F' as well as through the spiral passage around the freezing vessel. Within the latter is mounted the agitator E and the scraper E' and the driving gear for the same is exterior of and adjacent to the head $B^2$ through which extends the driving shafts for the said agitator E and the scraper E'.

From the foregoing it will be seen that practically the entire cream surface is cooled both in the vertical and the horizontal types of machines.

It is understood that when using the machine, the vessel C is filled to about one-half of its depth, and in freezing swells to about double its original bulk, and by cooling the heads as well as the sides, the time consumed for one operation is reduced considerably, and hence the daily capacity of the machine is proportionately increased.

Having thus described my invention, I claim as new and desire to secure by Letters Patent:

1. An ice cream freezer, comprising a vessel for containing the material to be frozen, a chamber surrounding the said vessel, an angular member forming a spiral passage in said chamber, the said member having the free edge of its horizontal section at the outer face of the said vessel and its vertical member spaced slightly from the wall forming the chamber, a hollow head common to both the said vessel and the said chamber, the interior of the said head being in communication with the said spiral passage and the said hollow head having an outlet for the said vessel, and means for circulating a freezing medium through the said head and passage.

2. An ice cream freezer, comprising an inner vessel for containing the material to be frozen, an outer vessel forming a chamber surrounding the said inner vessel, an angular member arranged in the space between the said vessels and forming a spiral passage, the said member having a horizontal section and a vertical section, the free edge of the horizontal section being at the exterior face of the inner vessel, and the vertical section extending adjacent the inner surface of the outer vessel, the convolutions of the member being spaced apart, hollow heads common to both the said vessel and the said chamber, the interiors of the said heads being in communication with the ends of the said spiral passage, a supply pipe connected with one of the said heads, and an outlet pipe leading from the other head.

3. In an ice cream freezer, an inner vessel for containing the material to be frozen, an outer vessel forming a chamber surrounding the said inner vessel, an angular member arranged spirally in said chamber, and having a horizontal portion, the free edge of which is at the exterior face of the inner vessel, and a vertical portion spaced from the inner surface of the outer vessel, the convolutions of the spiral being spaced apart, means for closing the space between the convolutions of the spiral at the said vertical portion, hollow closures common to both vessels and communicating with the ends of the spiral passage, a supply pipe for the freezing medium connected with one of said closures, and an outlet pipe leading from the other closure.

4. In an ice cream freezer a vessel for containing the material to be frozen, and having an inlet and an outlet for the material, a chamber surrounding the vessel, a spiral formed of angle iron, and arranged in the said chamber, the said spiral having its convolutions spaced apart, a hollow head for closing the said vessel and the said chamber, at one end thereof, the said head being connected with a source of freezing medium and communicating with the said chamber, means for closing the said vessel and chamber at the other end thereof, and an outlet pipe for the freezing medium.

5. An ice cream freezer, comprising an inner cylinder, an outer cylinder arranged in spaced relation to the said inner cylinder, a hollow head common to both cylinders and connected with a source of freezing medium, the said head having ports opening into the space between the said cylinders, and a spiral formed of angle iron and having its convolutions spaced apart, the said spiral being arranged in the space between the said cylinders to form a spiral passage in the said space.

6. An ice cream freezer, comprising an inner cylinder, an outer cylinder arranged in spaced relation to the said inner cylinder, a hollow head common to both cylinders and connected with a source of freezing medium, the said head having ports opening into the said space between the said cylinders, and a spiral formed of angle iron and having its convolutions spaced apart, the said spiral being arranged in the space between the said cylinders to form a spiral passage in the said space, the horizontal member of the angle iron having its free edge at the exterior face of the inner cylinder and the vertical member of the said angle iron being adjacent the inner surface of the outer cylinder.

7. An ice cream freezer, comprising an inner cylinder, an outer cylinder arranged in spaced relation to the said inner cylinder, a hollow head common to both cylinders and connected with a source of freezing medium, the said head having ports opening into the space between the said cylinders, a spiral formed of angle iron and having its convolutions spaced apart, the said spiral being arranged in the space between the said cylinders to form a spiral passage in the said space, the horizontal member of the angle iron having its free edge at the exterior face of the inner cylinder and the vertical member of the said angle iron being adjacent the inner surface of the outer cylinder, and a spiral band extending between the convolutions of the said angle iron spiral adjacent the inner surface of the outer cylinder.

8. An ice cream freezer, comprising a vertical inner cylinder, a vertical outer cylinder arranged in spaced relation to the said inner cylinder, a spiral formed of angle iron and having its convolutions spaced apart the said spiral being arranged in the space between the cylinders to form a spiral passage in the said space, the horizontal member of the angle iron having its free edge at the exterior face of the inner cylinder and the vertical member of the said angle iron being spaced from the inner surface of the outer cylinder, hollow closures for the ends of the cylinders, the bottom closure being connected with a source of freezing medium and communicating with the lower end of the spiral passage, the said bottom closure having a discharge opening communicating with the inner cylinder, the said top closure communicating with the upper end of said space, an outlet leading from the said upper closure, and an agitator within the inner cylinder.

In testimony whereof I have signed my name to this specification in the presence of two subscribing witnesses.

EMERY THOMPSON.

Witnesses:
   WILLIAM A. BUCK,
   D. B. DONOVAN.